Figure 1:
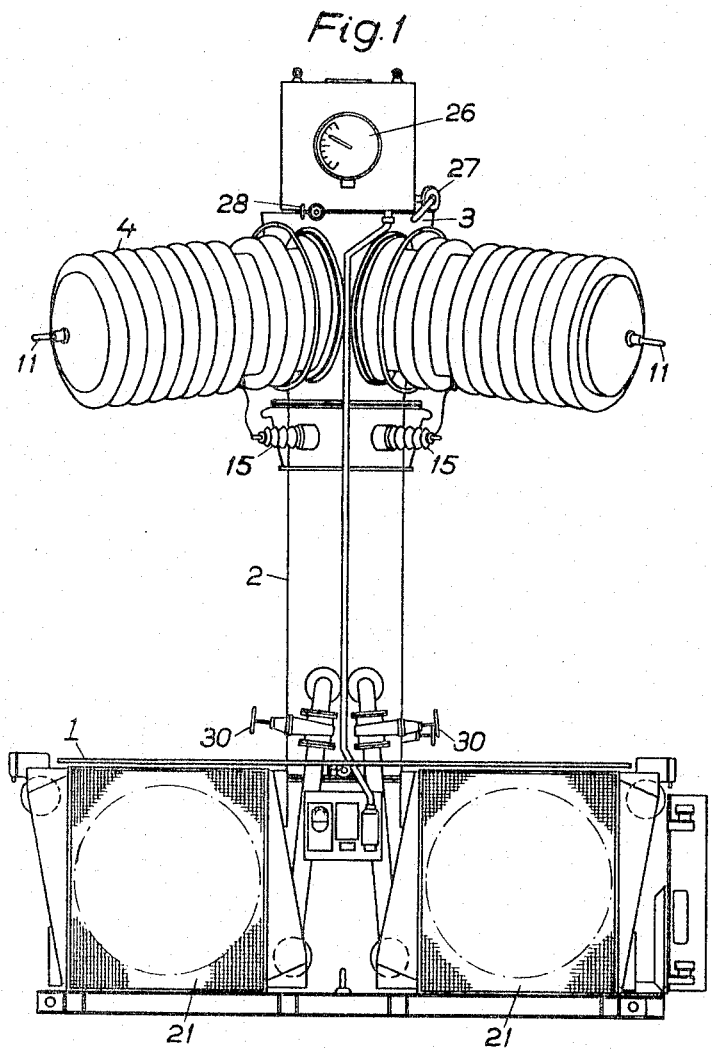

May 9, 1967 R. MYKLEBUST ET AL 3,319,156
COOLING ELECTRICAL EQUIPMENT

Filed Oct. 19, 1964 3 Sheets-Sheet 3

INVENTORS
ROGER MYKLEBUST
SVANTE FORSBERG
BERTIL LOMAR
BY
Bailey, Stephens & Huettig
ATTORNEYS

United States Patent Office 3,319,156
Patented May 9, 1967

3,319,156
COOLING ELECTRICAL EQUIPMENT
Roger Myklebust, Svante Forsberg, and Bertil Lomar, all of Ludvika, Sweden, assignors to Allmänna Svenska Elektriska Aktiebolaget, Vasteras, Sweden, a corporation of Sweden
Filed Oct. 19, 1964, Ser. No. 404,597
Claims priority, application Sweden, Oct. 24, 1963, 11,679/63
6 Claims. (Cl. 323—78)

HVDC transmission networks are provided with converter stations in which alternating current is converted to direct current, or vice versa, by the aid of ionic rectifiers. Said ionic rectifiers produce harmonics which will spread out on the A.C. lines which are connected to said converter stations. In order to prevent, or at least reduce, the spreading of the harmonics on the A.C. lines, three-phase high pass filters are connected to the three-phase A.C. lines. Such a filter consists of three resonance circuits, each of which is connected to one of the phases at one end while the other end is connected to a common zero point so that the whole filter is connected to the three-phase line in star connection. Each of said resonance circuits consists of a capacitive part which is connected in parallel to a second part consisting of a series connection of a reactance coil and a resistor for each phase of the A.C. lines. The invention refers to said second part and the three parts for a three-phase filter are connected to a unit which consists of a supporting column enclosing the three resistors and supporting a distributing chamber on which said three reactance coils are mounted. Each one of said three second parts is connected at one end to a phase of the three-phase network and at the other end to a common point, a zero point, which is preferably connected to earth. The three second parts of a three-phase filter are consequently star connected.

Filters have been used in rectifier plants for industrial use, but then it is usually a question of plants for relatively low voltages and moderate powers. In power transmission plants for high voltage D.C. the voltage is several hundred kv. and the power is often several hundred mw. The construction of harmonics filter for such plants must be based on a completely different basis so that usable units can be produced. The high voltage requires large insulation distances between the connections of the filter to the network and the large energy, which is developed in reactors and resistors, requires an effective cooling of the filter units. These requirements are well taken care of with a harmonics filter according to the invention, which is necessary to prevent most of the harmonics which are generated in the converters from spreading out on the lines, where they could cause disturbances on telecommunications in the vicinity of the lines.

Figure 2:
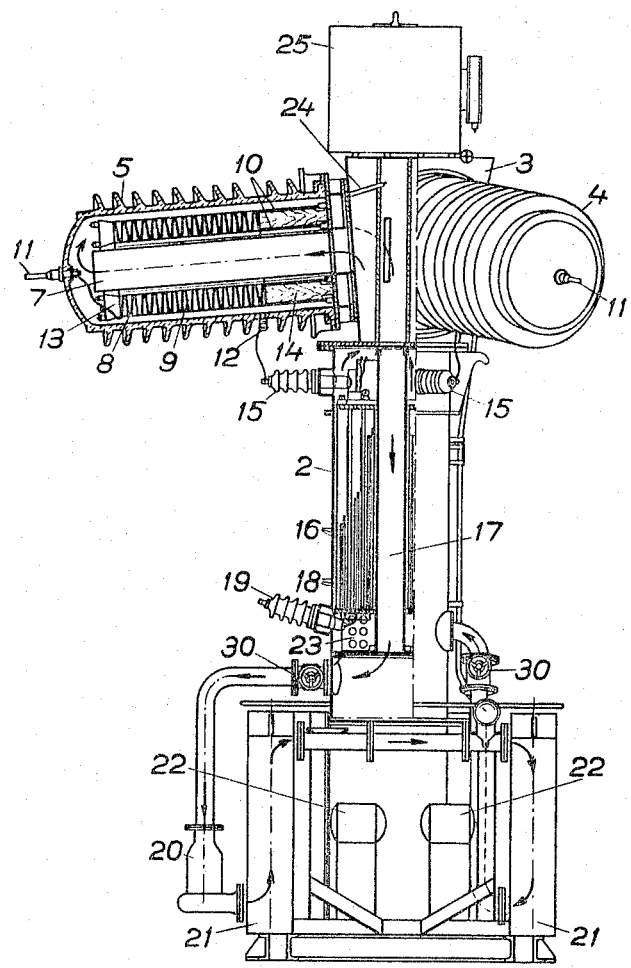
Figure 3:
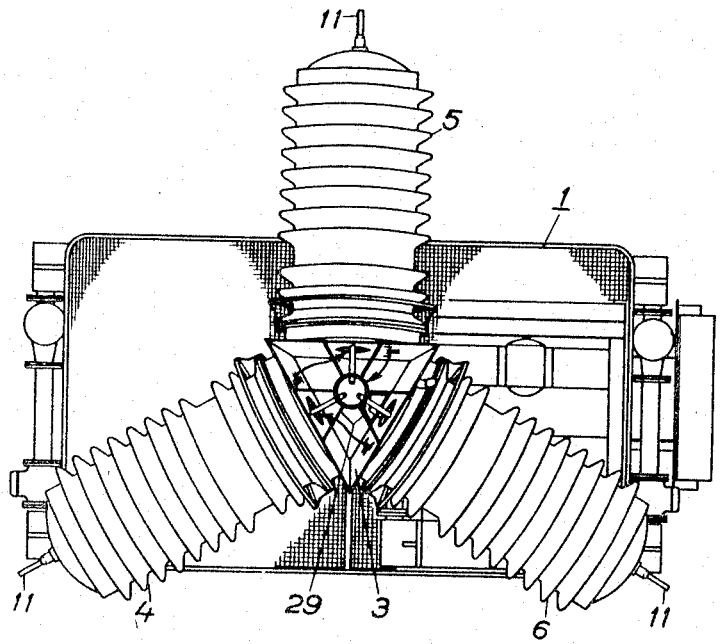

In the enclosed drawings FIG. 1 shows a front view of the part of the filter which comprises reactors and resistors. FIGURE 2 is a side view of the device and FIG. 3 shows the same from above.

In the drawings, a foundation 1 supports a column 2, on whose top a distribution chamber 3 is arranged. On the distribution chamber three insulation cylinders 4, 5, 6 are fastened in star connection and so that their outer ends lie somewhat lower than the connected ends. Each cylinder contains a centrally arranged tube 7 of insulating material, so that an annular channel 8 is formed between the cylinder 5 and the tube 7. In the annular channel the reactor coil 9 is arranged and this is retained with the help of bars 10 of insulating material, for example glass fibre. The outer end of the reactor coil is connected to a connection tap 11 which also makes the connection attachment for the high voltage line. The other end of the reactor coil which lies at a comparatively low insulation level, is connected to a terminal bolt 12, which is arranged on the under side of the cylinder 5. The disc wound reactor coil is held together with the help of outer spacer tubes 13 and an inner spacer ring 14 as well as the above mentioned bars 10.

The column 2 has in its upper part three connectors 15 in star connection, each one placed directly under each of the cylinders 4, 5 and 6, for connecting the inner end of the reactor coils 9 to the resistors 16 arranged inside the column 2, one for each phase. The resistors are arranged concentrically around a central channel 17 for a cooling medium. The resistors are insulated from each other and from the column by means of cylindrical tubes 18 of insulating material. Since the resistors should have the same resistance but have different radii their axial length is different, so that the resistor with the smallest radius has the largest axial length. Each of the resistors has its upper end connected to one of the terminals 15 and is thereby connected with the inner end of the reactor coil. The lower ends of the resistors 16 are connected to a zero point, which is connected to a zero point terminal 19 arranged at the lower part of the column. In certain cases it may be suitable to connect each resistor to its own zero point terminal.

For cooling the filter a suitable cooling medium is used, preferably transformer oil. A circulation pump 20 arranged on the base plate drives the cooling medium through one or several coolers 21, which are cooled with the help of fans driven by fan motors 22. Water cooled oil coolers could also be used instead of air cooling. From the coolers the cooling medium enters a circular space 23, situated below the resistors 16 in the column, and is forced around all the resistors upwards through the column and thereby brings about the cooling of the resistors. After having passed by and cooled the terminals 15 arranged above the resistors, the cooling medium is admitted to the distribution chamber 3, which is so divided with partition walls that the cooling medium enters the central tube 7 in the cylinder 5. At the outer end of the cylinder the cooling medium goes out in the annular channel 8 and during its movement turns back towards the distribution chamber past the reactor coil 9 and cools it. In the distribution chamber the cooling medium goes further to the central tube 7 in the next cylinder and cools its reactor coil in a corresponding way. After having passed and cooled all the coils, the cooling medium goes through the central channel 17 in the column back to the circulation pump 20. At the lower part of the column shut-off cocks 30 are arranged in the cooling medium tubes. The direction of the flow of the cooling medium is shown with arrows in FIG. 2. The direction of the flow can also be altered so that the cooled oil passes the reactors first.

At the highest part of the cylinders 4, 5, 6, ventilation pipes 24 are arranged which lead away the gas which may come in together with the oil. The gas is collected in an expansion vessel 25 arranged above the distribution chamber 3. This is provided with an oil level indicator 26, gas-operated relay 27 and an outlet cock 28. The shown construction gives a very advantageous solution to the problem of building up the reactive and resistive parts of a filter for very high voltage. By having the resistive part at low potential, it can be placed in the column which supports the parts of the filter which lie at high potential. The star connection of the reactive elements gives these connections completely sufficient insulation distance both between the different phases and to earth.

We claim:
1. In combination, three parts each comprising a series connection of a reactance coil and a resistor, a column having a distributing chamber therein near the top, three insulating cylinders connected to the column at substan- tially the level of the distributing chamber and communicating therewith, said cylinders extending substantially radially with respect to and being angularly spaced around the vertical axis of the column, said reactor coils being enclosed one in each of said insulating cylinders and said resistors being enclosed in said column below said distribution chamber.

2. In a device according to claim 1, said insulating cylinders sloping downwardly from the column to their outer ends and having connection for high voltage at their outer ends.

3. In a device according to claim 1, said resistors being arranged concentrically inside said column and cylindrical tubes of insulating material within the column separating said resistors from each other.

4. In a device according to claim 1, means connecting the ends of said resistors which are situated furthest away from said reactance coils to a common zero point.

5. In a device according to claim 1, a foundation, said column being mounted on said foundation, and means in said foundation for cooling said reactance coils and said resistors.

6. In a device as claimed in claim 5, means in said column, in said distribution chamber and in said insulation cylinders forming a coolant circuit, and means in said foundation to supply coolant to said circuit.

References Cited by the Examiner
UNITED STATES PATENTS

| | | | |
|---|---|---|---|
| 2,615,075 | 10/1952 | Paluev | 336—58 X |
| 3,028,566 | 4/1962 | Camilli | 336—57 |

JOHN F. COUCH, *Primary Examiner.*

A. D. PELLINEN, *Assistant Examiner.*